(12) United States Patent
Whittle et al.

(10) Patent No.: US 10,954,802 B2
(45) Date of Patent: Mar. 23, 2021

(54) TURBINE SECTION ASSEMBLY WITH CERAMIC MATRIX COMPOSITE VANE

(71) Applicant: Rolls-Royce plc, London (GB)

(72) Inventors: Michael J. Whittle, London (GB);
Anthony G. Razzell, London (GB);
Roderick M. Townes, London (GB);
David J. Shepherd, London (GB);
Duncan Forbes, London (GB)

(73) Assignee: Rolls-Royce plc

( * ) Notice: Subject to any disclaimer, the term of this patent is extended or adjusted under 35 U.S.C. 154(b) by 291 days.

(21) Appl. No.: 16/391,811

(22) Filed: Apr. 23, 2019

(65) Prior Publication Data
US 2020/0340363 A1    Oct. 29, 2020

(51) Int. Cl.
| F01D 25/28 | (2006.01) |
| F01D 11/00 | (2006.01) |
| F01D 9/04 | (2006.01) |
| F01D 5/28 | (2006.01) |

(52) U.S. Cl.
CPC ............ *F01D 5/282* (2013.01); *F01D 11/006* (2013.01); *F05D 2220/32* (2013.01); *F05D 2240/55* (2013.01); *F05D 2300/6033* (2013.01)

(58) Field of Classification Search
CPC .......... F01D 5/282; F01D 5/284; F01D 5/189; F01D 5/147; F01D 9/042; F01D 9/02; F01D 25/246; F01D 25/28; F01D 25/24; F01D 25/243; F01D 11/006; F01D 11/005; F01D 11/001; F05D 2220/32; F05D 2260/30; F05D 2260/31; F05D 2240/55; F05D 2240/12; F05D 2240/14; F05D 2240/80; F05D 2240/128; F05D 2300/6033; F05D 2300/10; F05D 2230/60
See application file for complete search history.

(56) References Cited

U.S. PATENT DOCUMENTS

| 4,979,872 A | * | 12/1990 | Myers ..................... F01D 9/065 403/131 |
| 5,078,576 A | | 1/1992 | Hayton |
| 5,160,251 A | * | 11/1992 | Ciokajlo ............... F01D 25/162 415/142 |
| 6,164,903 A | * | 12/2000 | Kouris ...................... F01D 9/04 415/135 |
| 6,325,593 B1 | | 12/2001 | Darkins, Jr. et al. |
| 6,439,841 B1 | * | 8/2002 | Bosel ...................... F01D 9/065 415/142 |
| 6,514,046 B1 | | 2/2003 | Morrison et al. |
| 6,558,114 B1 | | 5/2003 | Tapley et al. |
| 6,648,597 B1 | | 11/2003 | Widrig et al. |
| 6,860,716 B2 | | 3/2005 | Czachor et al. |
| 6,884,030 B2 | | 4/2005 | Darkins, Jr. et al. |
| 7,588,414 B2 | | 9/2009 | Wunderlich et al. |
| 7,762,766 B2 | | 7/2010 | Shteyman et al. |
| 8,245,518 B2 | * | 8/2012 | Durocher ................ F01D 9/065 60/796 |

(Continued)

*Primary Examiner* — Michael Lebentritt
*Assistant Examiner* — Eric J Zamora Alvarez
(74) *Attorney, Agent, or Firm* — Barnes & Thornburg LLP

(57) ABSTRACT

A turbine assembly adapted for use in a gas turbine engine with a turbine vane comprising ceramic matrix composite materials. The turbine vane is configured to redirect air moving through a primary gas path of the gas turbine engine. The turbine assembly includes a vane-stage support for holding the turbine vane in place relative to a turbine case.

19 Claims, 4 Drawing Sheets

(56) References Cited

U.S. PATENT DOCUMENTS

| | | |
|---|---|---|
| 8,371,127 B2 | 2/2013 | Durocher et al. |
| 8,454,303 B2 | 6/2013 | Garcia-Crespo |
| 9,097,141 B2 | 8/2015 | Paradis |
| 9,546,557 B2 | 1/2017 | Grooms, III et al. |
| 9,890,663 B2 | 2/2018 | Scott |
| 9,915,159 B2 | 3/2018 | Huizenga et al. |
| 10,054,009 B2 | 8/2018 | Scott |
| 10,174,627 B2 | 1/2019 | Chang et al. |
| 2004/0253096 A1 | 12/2004 | Legg |
| 2013/0094951 A1* | 4/2013 | McCaffrey ............ F01D 25/246 415/200 |
| 2014/0234118 A1 | 8/2014 | Beaujard et al. |
| 2014/0255174 A1 | 9/2014 | Duelm et al. |
| 2016/0123163 A1 | 5/2016 | Freeman et al. |
| 2016/0123164 A1 | 5/2016 | Freeman et al. |
| 2016/0177761 A1 | 6/2016 | Huizenga et al. |
| 2016/0201488 A1 | 7/2016 | Carr et al. |
| 2017/0022833 A1 | 1/2017 | Heitman et al. |
| 2017/0051619 A1 | 2/2017 | Tuertscher |
| 2018/0045117 A1 | 2/2018 | Groves, II et al. |
| 2018/0223680 A1 | 8/2018 | Hafner |
| 2018/0238181 A1 | 8/2018 | Reynolds et al. |
| 2018/0238184 A1 | 8/2018 | Reynolds et al. |
| 2018/0328187 A1 | 11/2018 | Oke |
| 2018/0340431 A1 | 11/2018 | Kerns et al. |
| 2018/0370158 A1 | 12/2018 | Gallier et al. |

* cited by examiner

TURBINE SECTION ASSEMBLY WITH CERAMIC MATRIX COMPOSITE VANE

FIELD OF THE DISCLOSURE

The present disclosure relates generally to gas turbine engines, and more specifically to turbine sections of such engines—especially those with ceramic matrix composite vanes.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Products of the combustion reaction directed into the turbine flow over airfoils included in stationary vanes and rotating blades of the turbine. The interaction of combustion products with the airfoils heats the airfoils to temperatures that require the airfoils to be made from high-temperature resistant materials and/or to be actively cooled by supplying relatively cool air to the vanes and blades. To this end, some airfoils for vanes and blades are incorporating composite materials adapted to withstand very high temperatures. Design and manufacture of vanes and blades from composite materials presents challenges because of the geometry and strength required for the parts.

SUMMARY

The present disclosure may comprise one or more of the following features and combinations thereof.

A turbine assembly adapted for use in a gas turbine engine with a turbine vane comprising ceramic matrix composite materials configured to redirect air moving through a primary gas path of the gas turbine engine may include a turbine case, a vane stage, and a vane-stage support. The turbine case may be arranged around a central reference axis. The turbine case may include an annular shell and at least one locating feature. The at least one locating feature may be formed integral with the annular shell.

In some embodiments, the vane stage may include the turbine vane comprising ceramic matrix composite materials and an inner vane seal land. The turbine vane may be shaped to form an airfoil that extends across the primary gas path of the gas turbine engine. The inner vane seal land may be located radially inward of the turbine vane. The inner vane seal land may be configured to be engaged by a rotating component to create a seal separating pressure zones within the gas turbine engine when the turbine assembly is used in the gas turbine engine.

In some embodiments, the vane-stage support may comprise metallic materials and may be configured to hold the turbine vane and the inner vane seal land in place relative to the turbine case. The vane-stage support may include a case mount, a spar, and a plurality of case fasteners. The case mount may couple to the annular shell and engage the at least one locating feature to axially align the vane-stage support relative to the vane stage. The spar may extend from the case mount radially through the airfoil of the turbine vane to the inner vane seal land. The plurality of threaded case fasteners may extend radially through the annular shell of the turbine case and into a portion of the case mount to secure the case mount to the turbine case. In some embodiments, the turbine vane and the inner vane seal land are coupled to the spar so that forces applied to the vane stage are carried by the spar to the case mount and case during use of the turbine assembly in the gas turbine engine.

In some embodiments, the case mount may include a coupling flange and a neck. The coupling flange may extend along a radially-inwardly facing surface of the turbine case and engage the at least one locating feature. The neck may extend radially inward from the coupling flange. The neck may be integrally formed with the coupling flange and the spar of the vane-stage support to form a one-piece, integral component.

In some embodiments, the plurality of threaded case fasteners may include at least three threaded case fasteners. The plurality of case fasteners may extend radially inward through the annular shell of the turbine case and into the coupling flange of the case mount to secure the coupling flange to the turbine case. In some embodiments, at least one of the plurality of threaded case fasteners may be located so that the vane-stage support is arranged in a predetermined orientation relative to the turbine vane when secured into the turbine assembly.

In some embodiments, the neck may include a radially outer interface, a radially inner interface, and an outer neck surface. The radially outer interface may interface the coupling flange and may have a first axial length when viewed circumferentially around the central reference axis. The radially inner interface may be spaced radially inward of the radially outer interface relative to the central reference axis and may interface the spar. The radially inner interface may have a second axial length when viewed circumferentially around the central reference axis that is less than the first axial length. The outer neck surface may extend between the radially outer interface and the radially inner interface.

In some embodiments, the coupling flange may include a forward portion and an aft portion. The forward portion may extend axially forward of the neck. The aft portion may extend axially aft of the neck.

In some embodiments, the at least one locating feature may include a locating shoulder. The locating shoulder may extend radially inward from the annular shell and engage the forward portion of the coupling flange.

In some embodiments, the plurality of threaded case fasteners may be located forward and aft of the neck. In some embodiments, the plurality of threaded case fasteners may secure the forward portion and the aft portion of the coupling flange to the turbine case.

In some embodiments, the plurality of case fasteners may include a forward threaded case fastener, an aft threaded case fastener, and a locating threaded case fastener. The forward threaded case fastener may extend through the annular shell and the forward portion of the coupling flange. The aft threaded case fastener spaced axially aft of the forward case fastener may extend through the turbine case and the aft portion of the coupling flange. The locating threaded case fastener spaced-apart from the forward case fastener and the aft case fastener may be located so that the vane-stage support is arranged in a predetermined orientation relative to the turbine vane when secured in the turbine assembly.

In some embodiments, the at least one locating feature may include a forward locating shoulder and an aft locating shoulder. The forward locating shoulder may extend radially inward from the annular shell. The aft locating shoulder may be spaced axially aft of the forward locating shoulder and may extends radially inward from the annular shell.

In some embodiments, the forward portion of the coupling flange may extend in confronting relation to an axially-aft face and a radially-inner face of the forward locating shoulder. In some embodiments, the aft portion of the coupling flange may extend in confronting relation to an axially-forward face and a radially-inner face of the aft locating shoulder. In some embodiments, the plurality of threaded case fasteners may extend through the annular shell and into the coupling flange to secure the coupling flange at axial locations between the forward locating shoulder and the aft locating shoulder of the turbine case to the turbine case.

In some embodiments, the case mount includes a coupling flange and a neck. The coupling flange may extend along a radially-inwardly facing surface of the turbine case and engage the at least one locating feature. The neck may extend radially inward from the coupling flange. In some embodiments, the neck may be integrally formed with the coupling flange and the spar of the vane-stage support to form a one-piece, integral component.

In some embodiments, the neck may be formed to include a radially outer interface, a radially inner interface, and an outer neck surface. The radially outer interface may engage with coupling flange and have a first axial length. The radially inner interface may be spaced radially inward of the radially outer interface with respect to the central reference axis and may engage with the spar. In some embodiments, the radially inner interface may have a second axial length that is less than the first axial length. The outer neck surface may extend radially between and interconnect the radially outer interface and the radially interface.

In some embodiments, the at least one locating feature may include a forward locating slot and an aft locating slot. The forward locating slot may extend radially outwardly into the annular shell. The aft locating slot may be spaced axially aft of the forward locating slot and may extend radially outwardly into the annular shell. In some embodiments, the forward portion of the coupling flange may extend into the forward locating slot and the aft portion of the coupling flange may extend into the aft locating slot to axially align and locate the case mount relative to the vane stage.

In some embodiments, the plurality of threaded case fasteners may include a forward case fastener, an aft case fastener, and a locating case fastener. The forward case fastener may extend through the annular shell and the forward portion of the coupling flange. The aft case fastener may be spaced axially aft of the forward case fastener and may extend through the aft portion of the coupling flange. The locating case fastener may be spaced-apart from the forward case fastener and the aft case fastener and may be located so that the vane-stage support is arranged in a predetermined orientation relative to the turbine vane when secured in the turbine assembly.

According to an aspect of the present disclosure, a turbine assembly adapted for use in a gas turbine engine may include a turbine case, a turbine vane, an inner vane seal land, and a vane-stage support. The turbine case may be arranged around a reference central axis. In some embodiments, the turbine case including at least one locating feature.

In some embodiments, the turbine vane may comprise ceramic matrix composite materials and may be shaped to form an airfoil. In some embodiments, the inner vane seal land may be located radially inward of the turbine vane. In some embodiments, the vane-stage support may be configured to hold the turbine vane and the inner vane seal land in place relative to the turbine case.

In some embodiments, the vane-stage support may include a case mount, a spar, and a plurality of fasteners. The case mount may couple to the turbine case and engage the at least one locating feature to axially locate the vane-stage support relative to the vane stage. The spar may extend from the case mount radially through the airfoil of the turbine vane to the inner vane seal land. The plurality of fasteners may extend radially through the turbine case and into the case mount to radially locate the vane-stage support relative to the turbine case. In some embodiments, the turbine vane and the inner vane seal land may be coupled to the spar so that forces applied to the vane stage are carried by the spar to the case mount and case during use of the turbine assembly in the gas turbine engine.

In some embodiments, the plurality of fasteners may be threaded fasteners. In some embodiments, one fastener of the plurality of fasteners may be located so that the vane-stage support is arranged in a predetermined orientation relative to the turbine vane when secured in the turbine assembly In some embodiments, the case mount may include a coupling flange and a neck. The coupling flange may extend along a radially-inwardly facing surface of the turbine case and engage the at least one locating feature. The neck may extend radially inward from the coupling flange and may be integrally formed with the spar of the vane-stage support to form a one-piece, integral component.

In some embodiments, the coupling flange may include a forward portion and an aft portion. The forward portion may extend axially forward of the neck. The aft portion may extend axially aft of the neck.

In some embodiments, the at least one locating feature may include a forward locating shoulder. The forward shoulder may extend radially inward from the turbine case and engage the forward portion of the coupling flange to axially locate the vane-stage support.

In some embodiments, the at least one locating feature may further include an aft locating shoulder. The aft locating shoulder may be spaced axially aft of the forward locating shoulder and may extend radially inward from the turbine case.

In some embodiments, the forward portion of the coupling flange may extend in confronting relation to an axially-aft face and a radially-inner face of the forward locating shoulder. In some embodiments, the aft portion of the coupling flange may extend in confronting relation to an axially-forward face and a radially-inner face of the aft locating shoulder.

In some embodiments, the at least one locating feature may include a forward locating slot and an aft locating slot. The forward locating slot may extend radially outward into the turbine case. The aft locating slot may be spaced axially aft of the forward locating slot and may extend radially outward into the turbine case. In some embodiments, the forward portion of the coupling flange may be arranged in the forward locating slot and the aft portion of the coupling flange may be arranged in the aft locating slot to axially locate the vane-stage support relative to the turbine case.

In some embodiment, the vane-stage support may further include at least one case fastener. In some embodiments the at least one case fastener may extend radially through the turbine case and into a portion of the case mount and secure the case mount to the turbine case.

In some embodiments, the at least one locating feature may include a forward locating hanger. The forward locating hanger may be shaped to include a radially extending portion and an axially extending portion. The radially extending portion may extend radially-inwardly from the turbine case. The axially extending portion may extend axially aft from the radially extending portion to form an L-shape.

These and other features of the present disclosure will become more apparent from the following description of the illustrative embodiments.

DETAILED DESCRIPTION OF THE DRAWINGS

Figure 1:
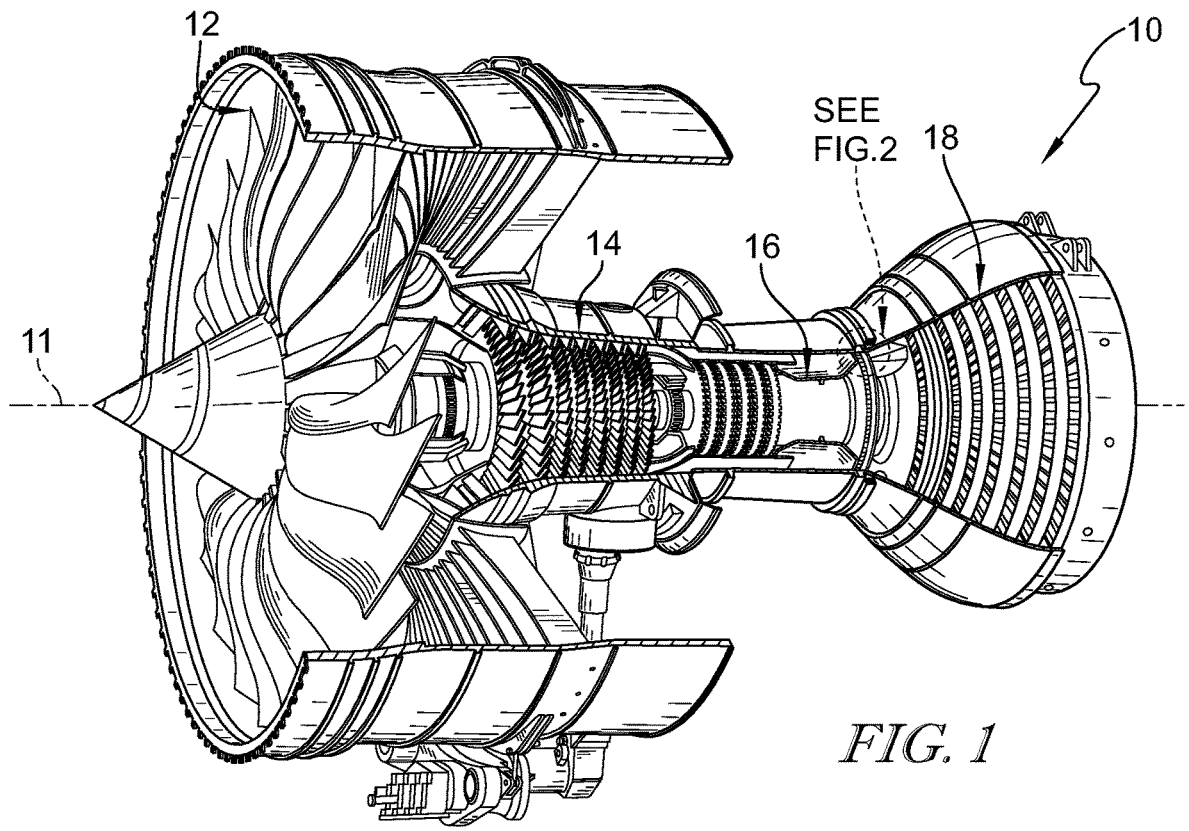
FIG. 1 is a cutaway view of a gas turbine engine that includes a fan, a compressor, a combustor, and a turbine assembly in accordance with the present disclosure that is adapted to extract work from hot combustion products received from the combustor.

For the purposes of promoting an understanding of the principles of the disclosure, reference will now be made to a number of illustrative embodiments illustrated in the drawings and specific language will be used to describe the same.

Figure 2:
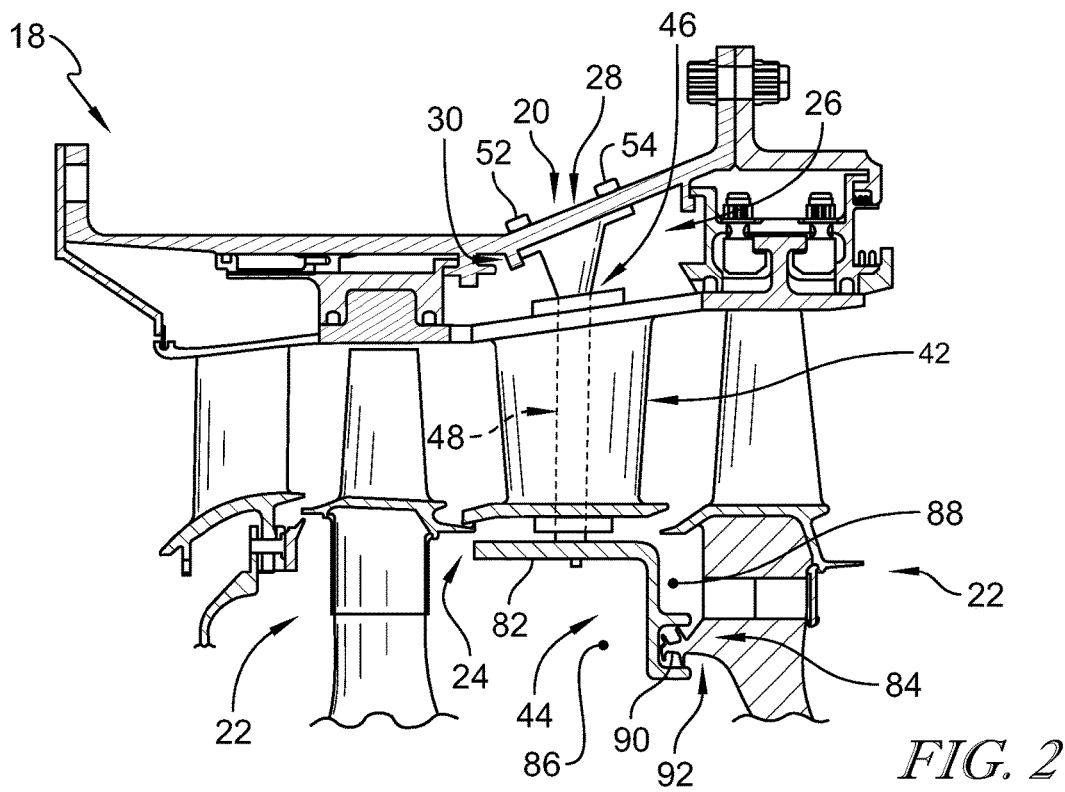
FIG. 2 is a cross sectional view of a portion of the turbine assembly of the gas turbine engine of FIG. 1 showing that the turbine assembly includes a turbine case, a plurality of turbine wheel assemblies, a vane stage made up of a vane with an airfoil and an inner vane seal land engaged by a seal rotor included in a turbine wheel assembly, and a vane-stage support that holds the vane stage in place relative to the turbine case.

A turbine assembly 18 according to the present disclosure is adapted for use in a gas turbine engine 10 as suggested in FIGS. 1 and 2. The gas turbine engine 10 includes a fan 12, a compressor 14, a combustor 16, and the turbine assembly 18. The fan 12 generates thrust for propelling an aircraft. The compressor 14 compresses and delivers air to the combustor 16. The combustor 16 mixes fuel with the compressed air received from the compressor 14 and ignites the fuel. The hot, high-pressure gases from the burning fuel are directed into the turbine 18 where the turbine 18 extracts work from the gases to drive the compressor 14 and the fan 12. In other embodiments, the gas turbine engine 10 may include a shaft, turboprop, or gearbox in place of the fan 12.

The turbine assembly 18 includes a turbine case 20, a plurality of turbine wheel assemblies 22, a vane stage 24, and a vane-stage support 26 as shown in FIG. 2. Each turbine wheel assembly 22 is configured to interact with the hot combustion gases from the combustor 16 and rotate about the center axis 11 of the gas turbine engine 10 to drive the compressor 14 and/or the fan 12. The vane stage 24 is located between the turbine wheel assemblies 22 and includes (a) a turbine vane 42 configured to redirect air moving through a primary gas path 23 of the gas turbine engine 10 and (b) an inner vane seal land 44 that is engaged by a seal rotor 90 to seal compartments 86, 88 within the turbine assembly 18. The vane-stage support 26 is configured to hold the turbine vane 42 and the inner vane seal land 44 included in the vane stage 24 in place relative to the turbine case 20.

The vane-stage support 26 provides a means for holding the vane stage 24 in a predetermined orientation relative to the turbine case 20 while also transferring aerodynamic loads applied to the vane stage 24 out through the turbine case 20. In the illustrative embodiments, the vane stage 26 is axially and radially located relative to the turbine case 20 using features 30 in the case 20 and threaded fasteners 50, 52, 54. The vane stage 26 also engages the turbine vane 42 and the inner vane seal land 44 so that forces applied to the vane stage 24 are carried by the vane-stage support 26 and case 20 during use of the turbine assembly 18 in the gas turbine engine 10.

In the illustrative embodiment, the turbine vane 42 included in the vane stage 24 comprises ceramic matrix materials while the vane-stage support 26 comprises metallic materials. The ceramic matrix composite vane 42 is adapted to withstand high temperatures, but may have relatively low strength compared to the metallic vane-stage support 26. The vane-stage support 26 provides structural strength to the vane stage components 42, 44 by receiving the force loads, such as the aerodynamic loads applied to the vane 42 and the axial loads applied to the inner vane seal land 44, and transferring the loads directly from the vane-stage support 26 out through the casing 20.

Figure 3:
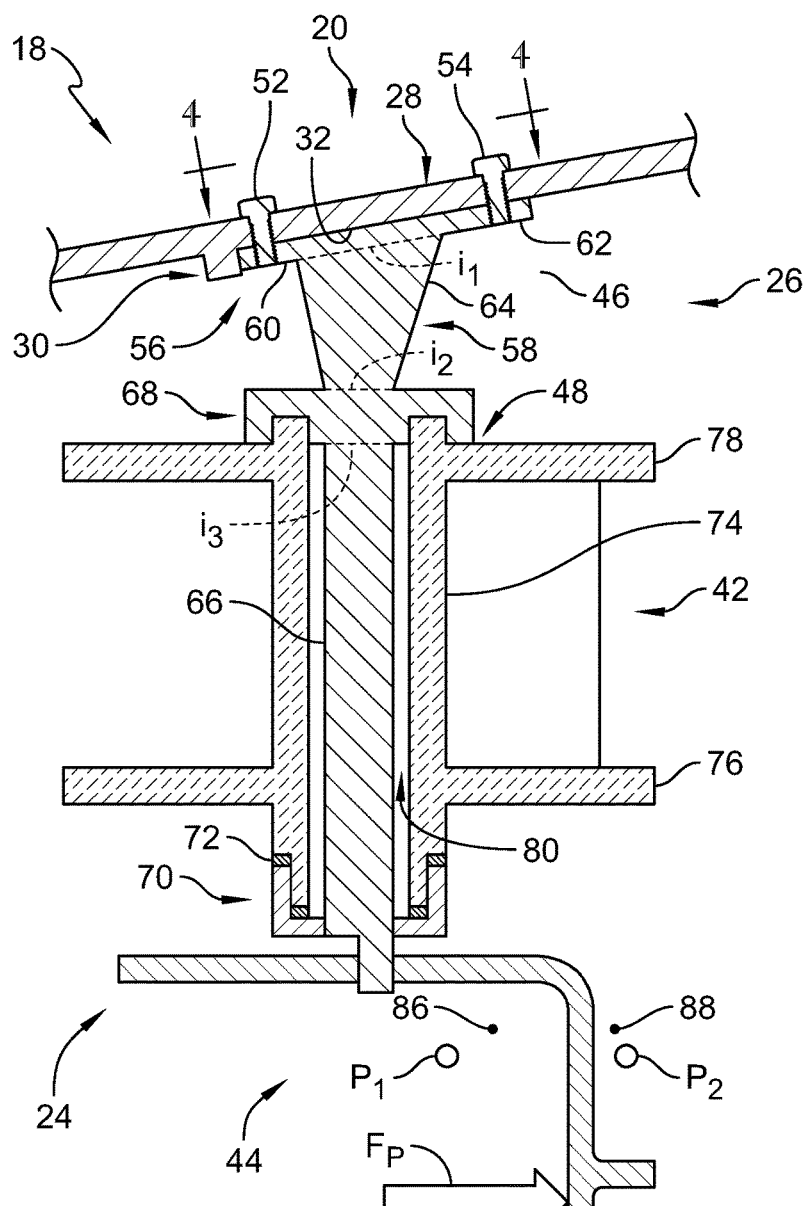
FIG. 3 is a detail view of the turbine assembly of FIG. 2 showing the vane stage support includes a case mount axially located relative to the case by a locating feature included in the case, a spar that extends from the case mount radially through the airfoil of the turbine vane stage and coupled to an inner vane seal land to transmit forces applied to the vane stage to the case mount and out through the turbine case, and a plurality of threaded case fasteners extending radially through the turbine case and into the case mount to secure the case mount to the turbine case.

The vane-stage support 26 includes a case mount 46, a spar 48, and a plurality of fasteners 50, 52, 54 as shown in FIG. 3. The case mount 46 is coupled directly to the turbine case 20 and engages a locating feature 30 integral with the turbine case 20 to axially align the vane-stage support 26 relative to the vane stage 24. The spar 48 extends from the case mount 46 radially through the turbine vane 42 to the inner vane seal land 44. The plurality of threaded case fasteners 50, 52, 54 extend radially through the turbine case 20 and into a portion of the case mount 46 to secure the case mount 46 to the turbine case 20.

In the illustrative embodiment, at least one threaded fastener 50 of the plurality of threaded case fasteners 50, 52, 54 is a locating threaded case fastener 50. The locating case fastener 50 is located so that the vane-stage support 26 is arranged in a predetermined orientation relative to the turbine vane 42 when secured into the turbine assembly 18. The plurality of fasteners 50, 52, 54 also transfer axial and circumferential loads from the vane stage to the case mount 46 and spar 48 out through the case 20.

The locating feature 30 of the turbine case 20 and the threaded case fasteners 50, 52, 54 axially and radially locate the vane-stage support 26 relative to the case 20. The locating shoulder 30 axially locates the vane-stage support 26 relative to the case 20 without blocking radial inward movement of the vane-stage support 26 relative to the central axis 11, while the threaded case fasteners 50, 52, 54 radially locate the vane-stage support 26 and block radial inward movement of the vane-stage support 26.

The case mount 46 includes a coupling flange 56 and a neck 58 as shown in FIG. 3. The coupling flange 56 extends along a radially-inwardly facing surface 32 of the turbine case 20 and engages the locating shoulder 30. The neck 58 extends radially inward from the coupling flange 56 and is integrally formed with the coupling flange 56 and the spar 48 to form a one-piece, integral component.

The coupling flange 56 includes a forward portion 60 and an aft portion 62 as shown in FIG. 3. The forward portion 60 extends axially forward of the neck 58 and engages the locating shoulder 30. The aft portion 62 extends axially aft of the neck 58.

The neck 58 includes a radially outer interface i1, a radially inner interface i2, and an outer neck surface 64 as shown in FIG. 3. The radially outer interface i1 interfaces the coupling flange 56. The radially inner interface i2 is spaced radially inward of the radially outer interface i1 relative to the central reference axis 11 and interfaces the spar 48. The outer neck surface 64 extends between and interconnects the radially outer and inner interfaces i1, i2.

In the illustrative embodiment, the radially outer interface i1 has a first axial length when viewed circumferentially around the central reference axis 11 and the radially inner interface i2 has a second axial length when viewed circumferentially around the central reference axis 11. The second axial length is less than the first axial length in the illustrative embodiment so that the outer neck surface 64 extends axially inward when moving radially inward from the outer interface i1 to the inner interface i2 when viewed circumferentially around the axis 11.

The spar 48 includes a rod 66, an outer load transfer collar 68, and an inner load transfer collar 70 as shown in FIG. 3. The rod 66 extends radially through the turbine vane 42 and supports the inner vane seal land 44 so that forces applied to the inner vane seal land 46 are carried by the spar 48 to the case mount 46 and the case 20 during use of the turbine assembly 18. In some embodiments, the rod 66 may be hollow and include cooling holes to transmit cooling air to the vane 42 and/or into the inter-disk cavity between the turbine wheels 22.

The outer load transfer collar 68 extends axially forward and aft of the rod 66 and contacts the turbine vane 42 at a radially outer end of the turbine vane 42. The inner load transfer collar 70 is spaced radially inwardly from the outer load transfer collar 68 and extends axially forward and aft of the rod 66 and contacts the turbine vane 42 a radially inner end of the turbine vane 42. In the illustrative embodiment, the outer load transfer collar 68 and inner load transfer collar 70 contact the turbine vane 42 at the radially outer and inner ends of the turbine vane 42 to transfer aerodynamic loads applied to the vane 42 from the vane 42 to the spar 48 outside of the primary gas path 23.

In the illustrative embodiment the outer load transfer collar 68 is integrally formed with the rod 66 such that the rod 66 and the outer load transfer collar 68 are included in a one-piece support component. The inner load transfer collar 70 is a separate component assembled onto the rod 66 and fixed to the rod 66 by a suitable fastener such as a screwed joint, collet arrangement, clamp, or other suitable fastener. In some embodiments, the inner load transfer collar 70 is integrally formed with a portion of the inner vane seal land 44. In other embodiments, the outer load transfer collar 68 may be formed separately from the rod 66 and assembled to form the spar 48.

The rod 66 includes an interface i3 as shown in FIG. 3. The interface i3 is spaced radially inward of the interfaces i1, i2 relative to the axis 11 and interfaces the outer load transfer collar 68. The interface i3 has a third axial length when viewed circumferentially about the central axis 11. In the illustrative embodiment, the third axial length is equal to the second axial length. In other embodiments, the third axial length may be less than the second axial length.

In the illustrative embodiment, a compliant layer 72 is arranged between the radially inner end of the turbine vane 42 and the inner load transfer collar 70 like as shown in FIG. 3. The compliant layer 72 is configured to seal between the radially inner end of the turbine vane 42 and the inner load transfer collar 70. The compliant layer 72 is also configured to allow radial movement of the turbine vane 42 relative to the vane-stage support 26 in response to thermal growth mismatch between the vane 42 and the vane-stage support 26 caused by different coefficients of thermal expansion of the vane 42 and the support 26 during use of the turbine assembly 18.

Figure 4:
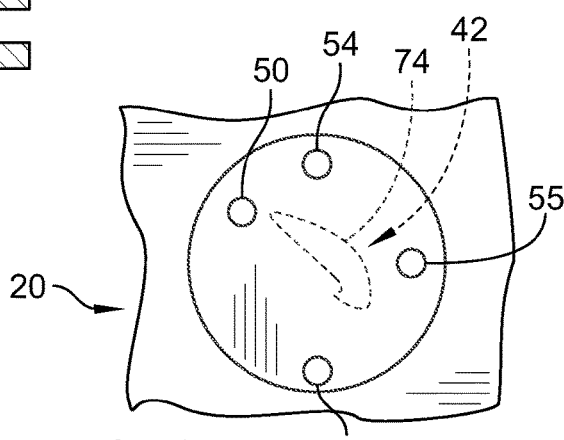
FIG. 4 is a top view of the turbine assembly of FIG. 3 taken along line 4-4 showing that at least one of the plurality of threaded case fasteners is located so that the vane-stage support is arranged in a predetermined orientation relative to the turbine vane when the vane-stage support is secured into the turbine assembly.

The plurality of fasteners 50, 52, 54 include the locating threaded case fastener 50, a forward threaded fastener 52, and an aft threaded fastener 54 as shown in FIGS. 3 and 4. The forward threaded case fastener 52 extends through the turbine case 20 and the forward portion 60 of the coupling flange 56. The aft threaded case fastener 54 is spaced axially aft of the forward case fastener 52 and extends through the turbine case 20 and the aft portion 62 of the coupling flange 56. The locating threaded case fastener 50 is spaced-apart from the forward case fastener 52 and the aft case fastener 54 and is located so that the vane-stage support 26 is arranged in a predetermined orientation relative to the turbine vane 42 when secured in the turbine assembly 18.

In some embodiments, the plurality of threaded case fasteners 50, 52, 54, 55 may include at least two threaded case fasteners 50, 52 coupling the case mount 46 to the case 20. A minimum of two threaded case fasteners 50, 52 may be used to couple the case mount 46 to the case 20 provided that the necessary anti-rotation features and deflection features are included in the case 20. In the other embodiments, the plurality of threaded case fasteners 50, 52, 54, 55 may include at least three threaded case fasteners 50, 52, 54. In the illustrative embodiment, the plurality of threaded case fasteners 50, 52, 54, 55 include more than three threaded case fasteners 50, 52, 54, 55. The number of threaded case fasteners 50, 52, 54, 55 used to couple the case mount 46 to the case 20 is a compromise between the size, weight, and cost of the assembly 18 and the pre-load capability.

Turning again to the turbine case 20, the turbine case 20 includes an annular shell 28 and the locating feature 30. The annular shell 28 is arranged to extend around the central reference axis 11. The locating feature 30 is integrally formed with the annular shell 28. In the illustrative embodiment, the locating feature 30 is a locating shoulder 30 that extends radially inward from the annular shell 28. In some embodiments, the shoulder may be an annular ring that extends around the central axis 11.

Turning again to the vane stage 24, the turbine vane 42 includes the airfoil 74, an inner end wall 76, and an outer end wall 78 as shown in FIG. 3. The inner end wall 76 is spaced radially inward of the outer end wall 78. The airfoil 74 extends between and interconnects the outer end wall 78 and the inner end wall 76. The airfoil 74 is shaped to redirect air moving along the primary gas path 23 of the turbine assembly 18 that extends radially from the outer end wall 78 to the inner end wall 76. The outer end wall 78 defines a radially outer boundary of the primary gas path 23 and the inner end wall 76 defines a radially inner boundary of the primary gas path 23.

The airfoil 74 is also shaped to include a vane cavity 80 extending radially through the airfoil 74 and opens at the inner and outer end walls 76, 78. The rod 66 of the spar 48 extends from the case mount 46 radially through the cavity 80 of the airfoil 74 of the turbine vane 42 to the inner vane seal land 44.

In the illustrative embodiment, the outer end wall 78, inner end wall 76, and the airfoil 74 of the vane 42 are integrally formed from ceramic matrix composite materials such that the outer end wall 78, inner end wall 76, and the airfoil 74 are included in a one-piece vane component as shown in FIGS. 2 and 3. In other embodiments, the outer end wall 78, inner end wall 76, and the airfoil 74 may be formed as separate components.

The inner vane seal land 44 includes a seal panel 82 and seal lands 84 as shown in FIGS. 2 and 3. The seal panel 82 divides the inter-disk cavity into axially adjacent compartments 86, 88 within the turbine assembly 18. The seal lands 84 extend axially aft and away from the seal panel 82. At least one seal land 84 is engaged by a rotatable seal element 90 of the turbine wheel 22 as shown in FIG. 2. In the illustrative embodiment, both seal lands 84 are engaged with the rotating seal element 90 to form a compartment seal 92 between the upstream and downstream turbine wheel assemblies 22. In some embodiments, the inner load transfer collar 70 is integrally formed with the seal panel 82 of the inner vane seal land 44.

The compartment seal 92 between the upstream and downstream turbine wheel assemblies 22 results in a first pressure P1 on the upstream turbine wheel side and a second pressure P2 on the downstream turbine wheel side. In the illustrative embodiment, the first pressure P1 is greater than the second pressure P2 resulting in a difference of pressure on either side of the inner vane seal land 46. The difference of pressure causes the pressure force Fp to act on the inner vane seal land 46 as shown in FIG. 3. The pressure force Fp results in an axial moment in the turbine assembly 18.

Figure 5:
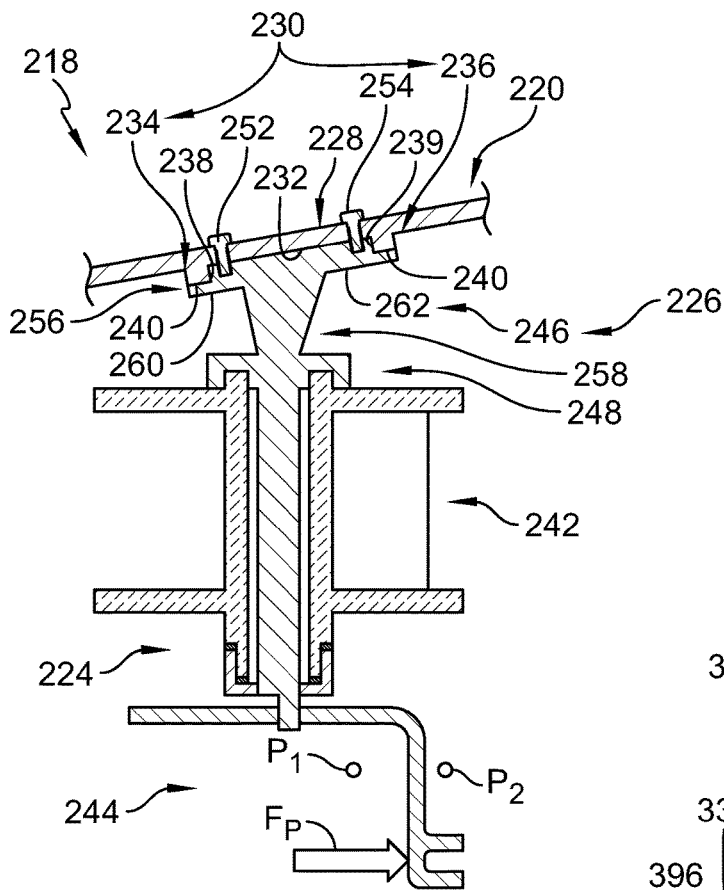
FIG. 5 is a detail view of another embodiment of a vane stage support to be included in the turbine assembly of FIG. 2 showing that the vane stage includes a case mount axially located relative to the case by a forward locating feature and an aft locating feature included in the case, a spar that extends from the case mount radially through vane stage to transmit forces applied to the vane stage to the case mount and out through the turbine case, and a plurality of threaded case fasteners extending radially through the turbine case and into the case mount to radially locate and secure the case mount to the turbine case.

Another embodiment of a turbine assembly 218 in accordance with the present disclosure is shown in FIG. 5. The turbine assembly 218 is substantially similar to the turbine assembly 18 shown in FIGS. 1-3 and described herein. Accordingly, similar reference numbers in the 200 series indicate features that are common between the turbine assembly 18 and the turbine assembly 218. The description of the turbine assembly 18 is incorporated by reference to apply to the turbine assembly 218, except in instances when it conflicts with the specific description and the drawings of the turbine assembly 218.

The turbine assembly 218 includes a turbine case 220, a vane stage 224, and a vane-stage support 226 as shown in FIG. 5. The vane stage 224 is located between the turbine wheel assemblies 22 and includes a turbine vane 242 configured to redirect air received from an upstream turbine wheel assembly 22 moving through a primary gas path 23 of the gas turbine engine 10 toward a downstream turbine wheel assembly 22. The vane-stage support 226 is configured to hold the turbine vane 242 and an inner vane seal land 244 included in the vane stage 224 in place relative to the turbine case 220.

The turbine case 220 includes an annular shell 228 and locating features 230 as shown in FIG. 5. The annular shell 228 is arranged to extend around the central axis 11. The locating features 230 are integrally formed with the annular shell 228.

The locating features 230 include a forward locating shoulder 234 and an aft locating shoulder 236 as shown in FIG. 5. The forward locating shoulder 234 extends radially inward from the annular shell 228. The aft locating shoulder 236 is spaced axially aft of the forward locating shoulder 234 and extends radially inward from the annular shell 228.

Each of the forward and aft locating shoulders 234, 236 include an axial face 238, 239 and a radially-inner face 240 as shown in FIG. 5. The forward locating shoulder 234 includes an axially-aft face 238, while the aft locating shoulder 236 includes an axially-forward face 239 that faces the axially-aft face 238 of the forward locating shoulder 234.

The vane-stage support 226 includes a case mount 246, a spar 248, and a plurality of fasteners 252, 254 as shown in FIG. 5. The case mount 246 is coupled directly to the turbine case 220 and engages the forward and aft locating features 234, 236 integral with the turbine case 220 to axially align the vane-stage support 226 relative to the vane stage 224. The spar 248 extends from the case mount 246 radially through the turbine vane 242 to the inner vane seal land 244. The plurality of threaded case fasteners 252, 254 extend radially through the annular shell 228 turbine case 220 and into a portion of the case mount 246 to secure the case mount 246 to the turbine case 220.

The case mount 246 includes a coupling flange 256 and a neck 258 as shown in FIG. 5. The coupling flange 256 extends along a radially-inwardly facing surface 232 of the turbine case 220 and engages the forward and aft locating shoulders 234, 236. The neck 258 extends radially inward from the coupling flange 256 and is integrally formed with the coupling flange 256 and the spar 248 to form a one-piece, integral component.

The coupling flange 256 includes a forward portion 260 and an aft portion 262 as shown in FIG. 5. The forward portion 260 extends axially forward of the neck 258 and engages the forward locating shoulder 234. The aft portion 262 extends axially aft of the neck 258 and engages the aft locating shoulder 236.

In the illustrative embodiment, the forward portion 260 of the coupling flange 256 extends in confronting relation to the axially-aft face 238 and the radially-inner face 240 of the forward locating shoulder 234. Additionally, the aft portion 262 of the coupling flange 256 extends in confronting relation to the axially-forward face 239 and the radially-inner face 240 of the aft locating shoulder 236.

The plurality of threaded case fasteners 50, 252, 254 include a locating threaded case fastener 50, a forward threaded case fastener 252, and an aft threaded case fastener 252. The case fasteners 50, 252, 254 extend through the annular shell 228 and into the coupling flange 256 to secure the coupling flange 256 at axial locations between the forward locating shoulder 234 and the aft locating shoulder 236 to the turbine case 220.

Figure 6:
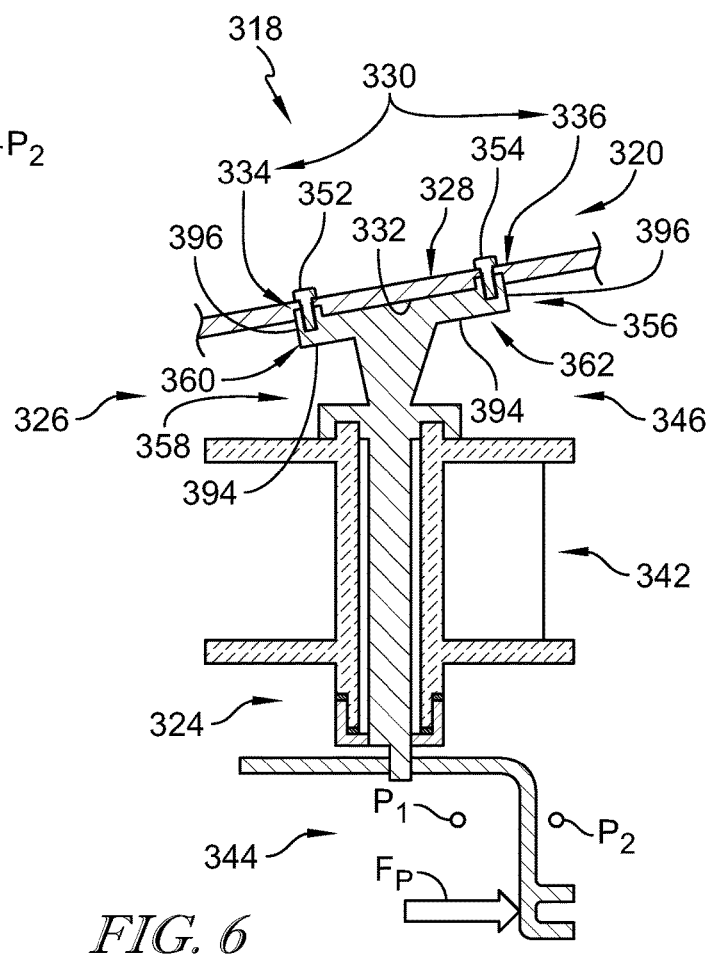
FIG. 6 is a detail view of another embodiment of a vane stage support to be included in the turbine assembly of FIG. 2 showing that the vane stage includes a case mount axially located relative to the case by a forward locating slot and an aft locating slot formed in the turbine case, a spar that extends from the case mount radially through the vane stage to transmit forces applied to the vane stage to the case mount and out through the turbine case, and a plurality of threaded case fasteners extending radially through the turbine case and into the case mount to radially locate and secure the case mount to the turbine case.

Another embodiment of a turbine assembly 318 in accordance with the present disclosure is shown in FIG. 6. The turbine assembly 318 is substantially similar to the turbine assembly 18 shown in FIGS. 1-3 and described herein. Accordingly, similar reference numbers in the 300 series indicate features that are common between the turbine assembly 18 and the turbine assembly 318. The description of the turbine assembly 18 is incorporated by reference to apply to the turbine assembly 318, except in instances when it conflicts with the specific description and the drawings of the turbine assembly 318.

The turbine assembly 318 includes a turbine case 320, a vane stage 324, and a vane-stage support 326 as shown in FIG. 6. The vane stage 324 is located between the turbine wheel assemblies 22 and includes a turbine vane 342 configured to redirect air received from an upstream turbine wheel assembly 22 moving through a primary gas path 23 of the gas turbine engine 10 toward a downstream turbine wheel assembly 22. The vane-stage support 326 is configured to hold the turbine vane 342 and an inner vane seal land 344 included in the vane stage 324 in place relative to the turbine case 320.

The turbine case 320 includes an annular shell 328 and locating features 330 as shown in FIG. 6. The annular shell 328 is arranged to extend around the central axis 11. The locating features 330 are integrally formed in the annular shell 328.

The locating features 330 include a forward locating slot 334 and an aft locating slot 336 as shown in FIG. 6. The forward locating slot 334 extends radially outwardly into the annular shell 328. The aft locating slot 336 is spaced axially aft of the forward locating slot 334 and extends radially outwardly into the annular shell 328.

The vane-stage support 326 includes a case mount 346, a spar 348, and a plurality of fasteners 352, 354 as shown in FIG. 6. The case mount 346 is coupled directly to the turbine case 320 and engages the forward and aft locating features 334, 336 integral with the turbine case 320 to axially align the vane-stage support 326 relative to the vane stage 324. The spar 348 extends from the case mount 346 radially through the turbine vane 342 to the inner vane seal land 344. The plurality of threaded case fasteners 352, 354 extend radially through the annular shell 328 turbine case 320 and into a portion of the case mount 346 to secure the case mount 346 to the turbine case 320.

The case mount 346 includes a coupling flange 356 and a neck 358 as shown in FIG. 6. The coupling flange 356 extends along a radially-inwardly facing surface 332 of the turbine case 320 and engages the forward and aft locating features 334, 336. The neck 358 extends radially inward from the coupling flange 356 and is integrally formed with the coupling flange 356 and the spar 348 to form a one-piece, integral component.

The coupling flange 356 includes a forward portion 360 and an aft portion 362 as shown in FIG. 6. The forward portion 360 extends axially forward of the neck 358 and engages the forward locating feature 334. The aft portion 362 extends axially aft of the neck 358 and engages the aft locating feature 336.

In the illustrative embodiment, the forward portion 360 of the coupling flange 356 extends into the forward locating slot 334 and the aft portion 362 of the coupling flange 356 extends into the aft locating slot 336. The forward and aft portions 360, 362 extend into the forward and aft locating slots 334, 336 to axially align and locate the case mount 346 relative to the vane stage 324.

The plurality of threaded case fasteners 50, 352, 354 include the locating case fastener 50, a forward case fastener 352, and an aft case fastener 354 as shown in FIG. 6. The forward case fastener 352 extends through the annular shell 328 and the forward portion 360 of the coupling flange 356. The aft case fastener 354 is spaced axially aft of the forward case fastener 352 and extends through the aft portion 362 of the coupling flange 346. The locating case fastener 50 is spaced-apart from the forward case fastener 352 and the aft case fastener 354 and located so that the vane-stage support 326 is arranged in a predetermined orientation relative to the turbine vane 342 when secured in the turbine assembly 318.

In the illustrative embodiments, the forward portion 360 and the aft portion 362 of the coupling flange 356 are each formed to include an axially extending portion 394 and a radially extending portion 396 as shown in FIG. 6. The axially extending portions 394 extend axially from the neck 358 of the case mount 346 along the radially inner surface 332 of the case 320. The radially extending portion 396 extends radially outward from the axially extending portion 394 into the forward or aft locating slot 334, 336.

In the illustrative embodiment, the forward case fastener 352 extends through the annular shell 328 at the forward locating slot 334 and into the radially extending portion 396 of the forward portion 360. The aft case fastener 354 extends through the annular shell 328 at the aft locating slot 336 and into the radially extending portion 396 of the aft portion 362. In other embodiments the forward and aft case fasteners 352, 354 may extend through the annular shell 328 at axial locations between the forward and aft locating slots 334, 336 and into the axially extending portions 394 of the forward and aft portions 360, 362 of the coupling flange 356.

Figure 7:
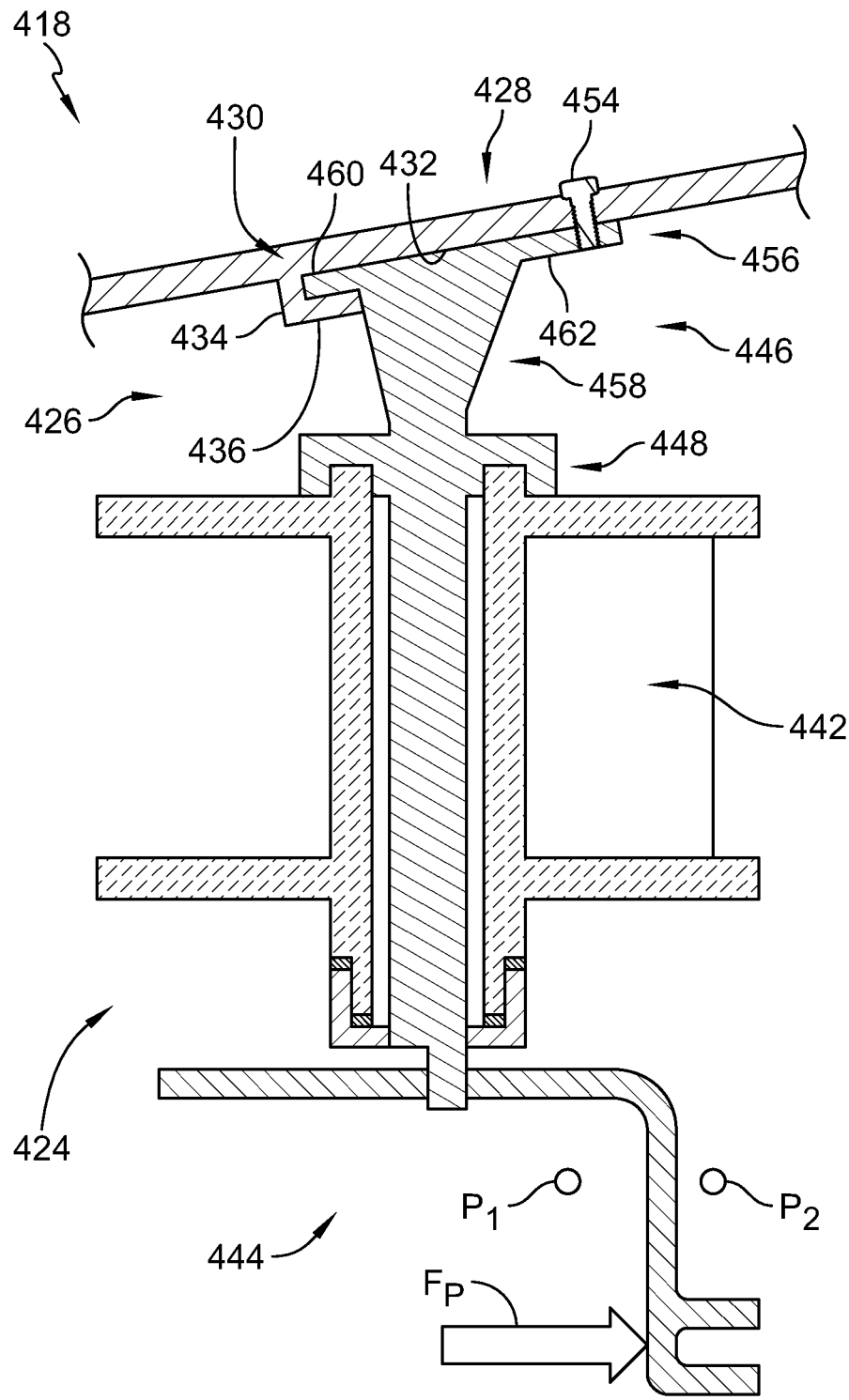
FIG. 7 is a detail view of another embodiment of a vane stage support to be included in the turbine assembly of FIG. 2 showing the vane stage support includes a case mount axially located relative to the case by a locating hook included in the case, a spar that extends from the case mount radially through the vane stage to transmit forces applied to the vane stage to the case mount and out through the turbine case, and a case fastener that extends into the case mount to couple the case mount directly to the case.

Another embodiment of a turbine assembly 418 in accordance with the present disclosure is shown in FIG. 7. The turbine assembly 418 is substantially similar to the turbine assembly 18 shown in FIGS. 1-3 and described herein. Accordingly, similar reference numbers in the 400 series indicate features that are common between the turbine assembly 18 and the turbine assembly 418. The description of the turbine assembly 18 is incorporated by reference to apply to the turbine assembly 418, except in instances when it conflicts with the specific description and the drawings of the turbine assembly 418.

The turbine assembly 418 includes a turbine case 420, a vane stage 424, and a vane-stage support 426 as shown in FIG. 7. The vane stage 424 is located between the turbine wheel assemblies 22 and includes a turbine vane 442 configured to redirect air received from an upstream turbine wheel assembly 22 moving through a primary gas path 23 of the gas turbine engine 10 toward a downstream turbine wheel assembly 22. The vane-stage support 426 is configured to hold the turbine vane 442 and an inner vane seal land 444 included in the vane stage 424 in place relative to the turbine case 420.

The turbine case 420 includes an annular shell 428 and a locating feature 330 as shown in FIG. 7. The annular shell 428 is arranged to extend around the central axis 11. The locating feature 430 is integrally formed in the annular shell 428. In the illustrative embodiment, the locating feature 430 is a locating hanger 430 that extends radially inward from the annular shell 430.

The locating feature 430 is formed to include a radially extending portion 434 and an axially extending portion 436 as shown in FIG. 7. The radially extending portion 434 extends radially inward from the annular shell 428. The axially extending portion 436 extends axially aft from the radially extending portion 434 to form an L-shape.

The vane-stage support 426 includes a case mount 446, a spar 448, and a case fastener 454 as shown in FIG. 7. The case mount 446 is coupled directly to the turbine case 420 and engages locating hanger 430 integral with the turbine case 420 to axially align the vane-stage support 426 relative to the vane stage 424. The spar 448 extends from the case mount 446 radially through the turbine vane 442 to the inner vane seal land 444. The case fastener 454 extends radially through the annular shell 428 turbine case 420 and into a portion of the case mount 446 to secure the case mount 446 to the turbine case 420.

The case mount 446 includes a coupling flange 456 and a neck 458 as shown in FIG. 7. The coupling flange 456 extends along a radially-inwardly facing surface 432 of the turbine case 420 and engages the locating hanger 430. The neck 458 extends radially inward from the coupling flange 456 and is integrally formed with the coupling flange 456 and the spar 448 to form a one-piece, integral component.

The coupling flange 456 includes a forward portion 460 and an aft portion 462 as shown in FIG. 7. The forward portion 460 extends axially forward of the neck 458 and engages the locating hanger 430. The aft portion 462 extends axially aft of the neck 458. The case fastener 454 extends radially through the case 420 and into the aft portion 462 of the coupling flange 456 to couple the coupling flange 456 to the annular shell 428 and transfer axial and circumferential load from the vane stage 424.

The present disclosure teaches using a rear end stop 30 formed from local thickening of the casing 20 and bolted connections 50, 52, 54, 55 to locate the vane-stage support 26 and hence support and hold the ceramic matrix composite vane 42. The attachment of the support 26 to the case 20 allows loads to be transferred outboard to the casing 20.

Bolting the vane-stage support 26 to the case 20 also offers a high, tuneable second moment area, reducing the stress induced on the case 20. Additionally, attaching the vane-stage support 26 directly to the case 20 reduces the weight while not requiring any complex geometry to be manufactured into the ceramic matrix composite material.

In metallic vanes embodiments, the metallic vanes are supported with a series of hooks and rails. In some metallic embodiments, the nozzle guide vane structure is supported on hooks and/or rails attached to the outer platform. However, the hook/rail arrangement does not work for structures manufactured from the lower strength SiC/SiC ceramic matrix composite materials. Therefore, in some ceramic matrix composite vanes embodiments, a metallic spar is often incorporated in addition to conventional hook/rail joints.

The present disclosure teaches transferring the load from the nozzle guide vanes 42, 242, 342, 442 outboard to the turbine casing 20, 220, 320, 420. In the illustrative embodiments, the aerodynamic loading is transferred at both the inner and outer extents of the vane 42, 242, 342, 442. The load may be transmitted through a metallic structure or spar 48, 248, 348, 448 out into the casing 20, 220, 320. An illustrative example is shown in FIG. 3.

In the illustrative embodiment, the spar 48, 248, 348, 448 is rigidly connected at the outer and features a sliding joint 70 at the inner. Although, in other embodiments, the vane 42, 242, 342, 442 may incorporate a sliding outer fixture and rigid inner attachment.

The present disclosure also teaches how the spar 48, 248, 348, 448 may be fixed to the casing 20, 220, 320, 420. In some embodiments, as shown in FIG. 3 is to provide a means of locating the metallic spar 48 before attaching the spar 48 to the case 20. The spar 48 is located using a protruding feature 30 at the forward or rear of the spar 48 and fixtures 50, 52, 54, 55 such as bolts, pins, or another suitable mechanical fastener interfacing the spar 48 and extending through the case 20. The end stop 30 is configured to react any forward axial loads on the vane 42 whilst also serving as a location feature 30 to streamline the assembly process. In the illustrative embodiment, the rearward axial loads are transferred through the bolted connections 50, 52, 54, 55 as are circumferential loads.

The spar 48, 248, 348, 448 may be hollow with one or more passage to allow coolant to transit from the outer cavity to cool the ceramic matrix composite. The spar 48, 248, 348, 448 may also be hollow to transit the cooling air through to the intra-disc cavity. High pressure air may be piped into each individual spar 48, 248, 348, 448. As such, in the event of damage to vanes 42, 242, 342, 442, cooling air would be uninterrupted to the remaining intact vanes 42, 242, 342, 442

In the illustrative embodiments, the metallic spar 48, 248, 348, 448 supports the vane 42, 242, 342, 442 with a degree of axial pre-lean of the vane spar 26, 226, 326, 426 and therefore a vane assembly could be incorporated into the design. Such an arrangement may optimize clearances across the running range and improve the interface with the rotating component 90.

In the illustrative embodiment of FIG. 3, a simple backstop 30 is used at the forward end of the spar 48. In other embodiments, the stop 30 may be used at the rear of the spar 48. In other embodiments, the backstop 30 may be a hook like in the illustrative embodiment of FIG. 7.

In the illustrative embodiment of FIG. 5, two location features 234, 236 protrude from the casing 220 to provide axial location through these end stops 234, 236, while radial and circumferential loads are taken up through the mechanical fasteners 50, 252, 254.

In the illustrative embodiment of FIG. 6, instead of features 234, 236 protruding from the casing 220, a recess 334, 336 is machined into the casing 320 and the case mount 346 of the support 26 is shaped to fit into this recess 334, 336. The removal of material from the casing 320 reduces the overall weight. Additionally, the waste from manufacturing the recesses 334, 336 into the case 20 is smaller when compared to removing large sections of metal to produce the protrusions. Additionally, the recesses 334, 336 may be keyed to provide a positive indication of when the vane assembly has been installed in the correct position as it is slid into place from downstream to upstream in the turbine.

The illustrative embodiments also use off center bolts 50 through the case mount 46 and into the casing 20, as shown in FIG. 4. The arrangement of one bolt in a location to orient the vane-stage support 26 prevents incorrect orientation of the case mount 46 and vane assembly during assembly.

For assembly, the vane 42, 242, 342, 442 may be slid towards the upstream end until aligning with the end stop 30, 230, 330, 430 or location feature. Once located against the location feature 30, 230, 330, 430, the bolts (or mechanical fasteners) may be dropped in from outside the casing 20, 220, 320, 420.

The outboard end of the spar 48, 248, 348, 448 may be configured depending on the specific application. Possible adjustments include increasing the second moment of area of the spar 48, 248, 348, 448 or the case mount 46, 246, 346, 446 in order to reduce peak stresses and reduce deflections.

Forging and machining methods may be used to manufacture the vane spar 26, 226, 326, 426 with features required to interface with the casing 20, 220, 320, 420. The support 26, 226, 326, 426 may be made of a high temperature capable metallic alloy such as a nickel alloy or, if the environment was cool enough, potentially Waspalloy or Hastelloy. C263 may be an option if the forged manufacturing route was selected. The casing 20, 220, 320, 420 may be manufactured from an oversized forging and machined the hooks could easily be machined in the correct locations.

The present disclosure uses simplified features 30, 230, 330, 430 in the case 20 and directly attaching the support 26, 226, 326, 426 so that complex features are not required in the ceramic matrix composite material. The outboard end of the spar may also be tuned to optimize stress and weight trade-offs. Additionally, directly attaching the support 26, 226, 326, 426 reduces the weight compared to vane carrier approach.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine assembly adapted for use in a gas turbine engine with a turbine vane comprising ceramic matrix composite materials configured to redirect air moving through a primary gas path of the gas turbine engine, the assembly comprising a turbine case arranged around a central reference axis, the turbine case including an annular shell and at least one locating feature that is formed integrally with the annular shell, a vane stage including the turbine vane comprising ceramic matrix composite materials shaped to form an airfoil that extends across the primary gas path of the gas turbine engine and an inner vane seal land located radially inward of the turbine vane, the inner vane seal land and a rotating component cooperate to create a seal that separates pressure zones within the gas turbine engine when the turbine assembly is used in the gas turbine engine, and a vane-stage support comprising metallic materials that is configured to hold the turbine vane and the inner vane seal land in place relative to the turbine case, the vane-stage support including a case mount that couples to the annular shell and engages the at least one locating feature to axially align the vane-stage support relative to the vane stage, a spar that extends from the case mount radially through the airfoil of the turbine vane to the inner vane seal land, and a plurality of threaded case fasteners that extend radially through the annular shell of the turbine case and into a portion of the case mount to secure the case mount to the turbine case, wherein the turbine vane and the inner vane seal land are coupled to the spar so that forces applied to the vane stage are carried by the spar to the case mount and case during use of the turbine assembly in the gas turbine engine.

2. The assembly of claim 1, wherein the case mount includes a coupling flange that extends along a radially-inwardly facing surface of the turbine case and engages the at least one locating feature and a neck that extends radially inward from the coupling flange and is integrally formed with the coupling flange and the spar of the vane-stage support to form a one-piece, integral component.

3. The assembly of claim 2, wherein the plurality of threaded case fasteners includes at least three threaded case fasteners that extend radially inward through the annular shell of the turbine case and into the coupling flange of the case mount to secure the coupling flange to the turbine case, and wherein at least one of the plurality of threaded case fasteners is located so that the vane-stage support is arranged in a predetermined orientation relative to the turbine vane when secured into the turbine assembly.

4. The assembly of claim 2, wherein the neck includes a radially outer interface that interfaces the coupling flange and has a first axial length when viewed circumferentially around the central reference axis, a radially inner interface spaced radially inward of the radially outer interface relative to the central reference axis that interfaces the spar and has a second axial length when viewed circumferentially around the central reference axis that is less than the first axial length, and an outer neck surface that extends between the radially outer interface and the radially inner interface.

5. The assembly of claim 4, wherein the coupling flange includes a forward portion that extends axially forward of the neck and an aft portion that extends axially aft of the neck.

6. The assembly of claim 5, wherein the at least one locating feature includes a locating shoulder that extends radially inward from the annular shell and engages the forward portion of the coupling flange and wherein the plurality of threaded case fasteners are located forward and aft of the neck and secure the forward portion and the aft portion of the coupling flange to the turbine case.

7. The assembly of claim 6, wherein the plurality of case fasteners includes a forward threaded case fastener that extends through the annular shell and the forward portion of the coupling flange, an aft threaded case fastener spaced axially aft of the forward case fastener that extends through the turbine case and the aft portion of the coupling flange, and a locating threaded case fastener spaced-apart from the forward case fastener and the aft case fastener and located so that the vane-stage support is arranged in a predetermined orientation relative to the turbine vane when secured in the turbine assembly.

8. The assembly of claim 5, wherein the at least one locating feature includes a forward locating shoulder that extends radially inward from the annular shell and an aft locating shoulder spaced axially aft of the forward locating shoulder that extends radially inward from the annular shell.

9. The assembly of claim 8, wherein the forward portion of the coupling flange extends in confronting relation to an axially-aft face and a radially-inner face of the forward locating shoulder, the aft portion of the coupling flange extends in confronting relation to an axially-forward face and a radially-inner face of the aft locating shoulder.

10. The assembly of claim 9, wherein the plurality of threaded case fasteners extends through the annular shell and into the coupling flange to secure the coupling flange at axial locations between the forward locating shoulder and the aft locating shoulder of the turbine case to the turbine case.

11. The assembly of claim 1, wherein the case mount includes a coupling flange that extends along a radially-inwardly facing surface of the turbine case and engages the at least one locating feature and a neck that extends radially inward from the coupling flange and is integrally formed with the coupling flange and the spar of the vane-stage support to form a one-piece, integral component, and wherein the neck is formed to include a radially outer interface that engages with coupling flange and has a first axial length, a radially inner interface spaced radially inward of the radially outer interface with respect to the central reference axis that engages with the spar and has a second axial length that is less than the first axial length, and an outer neck surface that extends radially between and interconnects the radially outer interface and the radially interface.

12. The assembly of claim 11, wherein the at least one locating feature includes a forward locating slot that extends radially outwardly into the annular shell and an aft locating slot spaced axially aft of the forward locating slot that extends radially outwardly into the annular shell and wherein a forward portion of the coupling flange extends into the forward locating slot and an aft portion of the coupling flange extends into the aft locating slot to axially align and locate the case mount relative to the vane stage.

13. The assembly of claim 12, wherein the plurality of threaded case fasteners includes a forward case fastener that extends through the annular shell and the forward portion of the coupling flange, an aft case fastener spaced axially aft of the forward case fastener that extends through the aft portion of the coupling flange, and a locating case fastener spaced-apart from the forward case fastener and the aft case fastener and located so that the vane-stage support is arranged in a predetermined orientation relative to the turbine vane when secured in the turbine assembly.

14. A turbine assembly, the assembly comprising
a turbine case arranged around a reference central axis, the turbine case including at least one locating feature,
a turbine vane comprising ceramic matrix composite materials shaped to form an airfoil,
an inner vane seal land located radially inward of the turbine vane, and
a vane-stage support configured to hold the turbine vane and the inner vane seal land in place relative to the turbine case, the vane-stage support formed to include a case mount that couples to the turbine case and engages the at least one locating feature to axially locate the vane-stage support relative to the turbine case, a spar that extends from the case mount radially through the airfoil of the turbine vane to the inner vane seal land, and a plurality of fasteners that extend radially through the turbine case and into the case mount to radially locate the vane-stage support relative to the turbine case, wherein the turbine vane and the inner vane seal land are coupled to the spar, and
wherein the case mount includes a coupling flange that extends along a radially-inwardly facing surface of the turbine case and engages the at least one locating feature and a neck that extends radially inward from the coupling flange and is integrally formed with the spar of the vane-stage support to form a one-piece, integral component, and wherein the coupling flange includes a forward portion that extends axially forward of the neck and an aft portion that extends axially aft of the neck.

15. The assembly of claim 14, wherein the plurality of fasteners are threaded fasteners and one fastener of the plurality of fasteners is located so that the vane-stage support is arranged in a predetermined orientation relative to the turbine vane when secured in the turbine assembly.

16. The assembly of claim 14, wherein the at least one locating feature includes a forward locating shoulder that extends radially inward from the turbine case and engages the forward portion of the coupling flange to axially locate the vane-stage support.

17. The assembly of claim 16, wherein the at least one locating feature further includes an aft locating shoulder spaced axially aft of the forward locating shoulder that extends radially inward from the turbine case, and wherein the forward portion of the coupling flange extends in confronting relation to an axially-aft face and a radially-inner face of the forward locating shoulder and the aft portion of the coupling flange extends in confronting relation to an axially-forward face and a radially-inner face of the aft locating shoulder.

18. The assembly of claim 14, wherein the at least one locating feature includes a forward locating slot that extends radially outward into the turbine case and an aft locating slot spaced axially aft of the forward locating slot that extends radially outward into the turbine case, and wherein the forward portion of the coupling flange is arranged in the forward locating slot and the aft portion of the coupling flange is arranged in the aft locating slot to axially locate the vane-stage support relative to the turbine case.

19. The assembly of claim 14, wherein the vane-stage support further includes at least one case fastener that extends radially through the turbine case and into a portion of the case mount and secures the case mount to the turbine case and wherein the at least one locating feature includes a forward locating hanger that is shaped to include a radially extending portion that extends radially-inwardly from the turbine case and an axially extending portion that extends axially aft from the radially extending portion to form an L-shape.

* * * * *